US010164262B2

(12) United States Patent
Okuno et al.

(10) Patent No.: US 10,164,262 B2
(45) Date of Patent: Dec. 25, 2018

(54) METHOD FOR PRODUCING A POROUS METAL BODY

(71) Applicants: SUMITOMO ELECTRIC INDUSTRIES, LTD., Osaka-shi, Osaka (JP); SUMITOMO ELECTRIC TOYAMA CO., LTD., Imizu-shi, Toyama (JP)

(72) Inventors: Kazuki Okuno, Itami (JP); Masahiro Kato, Itami (JP); Masatoshi Majima, Itami (JP); Tomoyuki Awazu, Itami (JP); Hidetoshi Saito, Imizu (JP); Junichi Nishimura, Imizu (JP); Keiji Shiraishi, Imizu (JP); Hitoshi Tsuchida, Imizu (JP); Kengo Tsukamoto, Imizu (JP)

(73) Assignees: SUMITOMO ELECTRIC INDUSTRIES, LTD., Osaka-shi, Osaka (JP); SUMITOMO ELECTRIC TOYAMA CO., LTD., Imizu-shi, Toyama (JP)

( * ) Notice: Subject to any disclaimer, the term of this patent is extended or adjusted under 35 U.S.C. 154(b) by 29 days.

(21) Appl. No.: 15/374,251

(22) Filed: Dec. 9, 2016

(65) Prior Publication Data
US 2017/0092957 A1 Mar. 30, 2017

Related U.S. Application Data

(62) Division of application No. 13/992,266, filed as application No. PCT/JP2011/077650 on Nov. 30, 2011.

(30) Foreign Application Priority Data

Dec. 8, 2010 (JP) .................................. 2010-273549
Dec. 8, 2010 (JP) .................................. 2010-273550
Dec. 24, 2010 (JP) .................................. 2010-287439

(51) Int. Cl.
*H01M 4/80* (2006.01)
*C22C 19/03* (2006.01)
(Continued)

(52) U.S. Cl.
CPC ............. *H01M 4/80* (2013.01); *B22F 3/1137* (2013.01); *B32B 15/01* (2013.01); *C22C 1/00* (2013.01);
(Continued)

(58) Field of Classification Search
CPC ....... C22C 13/00; C22C 19/051; C22C 19/03; C22C 1/0433; C22C 1/0483; C25D 50/50
See application file for complete search history.

(56) References Cited

U.S. PATENT DOCUMENTS

| 4,525,325 | A | 6/1985 | Livak |
| 4,791,035 | A | 12/1988 | Reichner |

(Continued)

FOREIGN PATENT DOCUMENTS

| CN | 1480542 A | 3/2004 |
| CN | 101447567 A | 6/2009 |

(Continued)

OTHER PUBLICATIONS

Bangwei, Zhang, and Xie Haowen. "Effect of Alloying Elements on the Amorphous Formation and Corrosion Resistance of Electroless Ni—P Based Alloys." Materials Science and Engineering: A 281. 1-2 (2000): 286-91. Web.

*Primary Examiner* — Stephan J Essex
(74) *Attorney, Agent, or Firm* — Drinker Biddle & Reath LLP

(57) ABSTRACT

Provided are a porous metal body that is excellent in terms of corrosion resistance and that is suitable for a collector for
(Continued)

batteries such as lithium-ion batteries, capacitors, or fuel cells; and methods for producing the porous metal body. A production method includes a step of coating a porous nickel body with an alloy containing at least nickel and tungsten or a metal containing at least tin; and a subsequent step of a heat treatment. Another production method includes a step of forming a nickel-plated layer on a porous base and then continuously forming an alloy-plated layer containing at least nickel and tungsten or tin, a step of removing the porous base, and a step of reducing metal. Such a method can provide a porous metal body in which tungsten or tin is diffused in a porous nickel body or a nickel-plated layer.

5 Claims, 1 Drawing Sheet

(51) Int. Cl.
| | | |
|---|---|---|
| C22F 1/10 | (2006.01) | |
| C25D 3/30 | (2006.01) | |
| C25D 5/50 | (2006.01) | |
| H01G 11/68 | (2013.01) | |
| H01G 11/70 | (2013.01) | |
| H01M 4/04 | (2006.01) | |
| H01M 4/66 | (2006.01) | |
| H01M 4/86 | (2006.01) | |
| B32B 15/01 | (2006.01) | |
| C23C 10/28 | (2006.01) | |
| C23C 30/00 | (2006.01) | |
| C23F 17/00 | (2006.01) | |
| C25D 3/56 | (2006.01) | |
| C25D 5/48 | (2006.01) | |
| C25D 1/08 | (2006.01) | |
| C22C 1/04 | (2006.01) | |
| B22F 3/11 | (2006.01) | |
| C22C 1/00 | (2006.01) | |
| C25D 1/00 | (2006.01) | |
| H01M 8/0232 | (2016.01) | |
| H01M 8/0245 | (2016.01) | |
| H01M 10/0525 | (2010.01) | |

(52) U.S. Cl.
CPC ............ *C22C 1/0433* (2013.01); *C22C 19/03* (2013.01); *C22F 1/10* (2013.01); *C23C 10/28* (2013.01); *C23C 30/00* (2013.01); *C23F 17/00* (2013.01); *C25D 1/003* (2013.01); *C25D 1/08* (2013.01); *C25D 3/30* (2013.01); *C25D 3/562* (2013.01); *C25D 5/48* (2013.01); *C25D 5/50* (2013.01); *C25D 5/505* (2013.01); *H01G 11/68* (2013.01); *H01G 11/70* (2013.01); *H01M 4/0452* (2013.01); *H01M 4/0469* (2013.01); *H01M 4/661* (2013.01); *H01M 4/662* (2013.01); *H01M 4/667* (2013.01); *H01M 4/8621* (2013.01); *H01M 4/8657* (2013.01); *B22F 2998/10* (2013.01); *H01M 8/0232* (2013.01); *H01M 8/0245* (2013.01); *H01M 10/0525* (2013.01); *Y02P 70/56* (2015.11)

(56) References Cited

U.S. PATENT DOCUMENTS

| | | | | |
|---|---|---|---|---|
| 5,725,750 | A * | 3/1998 | Tsubouchi | C25D 1/08 205/224 |
| 2003/0113577 | A1 | 6/2003 | Zheng | |
| 2005/0221163 | A1 * | 10/2005 | Yang | H01M 4/8621 429/482 |
| 2009/0011268 | A1 | 1/2009 | Shimizu et al. | |

FOREIGN PATENT DOCUMENTS

| | | |
|---|---|---|
| CN | 101476139 A | 7/2009 |
| CN | 101899690 A | 12/2010 |
| CN | 102255084 A | 11/2011 |
| EP | 0696649 A1 | 2/1996 |
| JP | 61-41739 A | 2/1986 |
| JP | S61-104038 A | 5/1988 |
| JP | 4-2795 A | 1/1992 |
| JP | H04-280074 A | 10/1992 |
| JP | 8-69801 A | 3/1996 |
| JP | 10-130878 A | 5/1998 |
| JP | 11-154517 A | 6/1999 |
| JP | 11-233151 A | 8/1999 |
| JP | WO 99/54076 | 10/1999 |
| JP | 2000-195522 A | 7/2000 |
| JP | 2002-241986 A | 8/2002 |
| JP | 2004-039491 A | 2/2004 |
| JP | 2004-143580 A | 5/2004 |
| JP | 2004-223505 A | 8/2004 |
| JP | 2005-078991 A | 3/2005 |
| JP | 2005-238113 A | 9/2005 |
| JP | 2005-285599 A | 10/2005 |
| JP | 2006-032144 A | 2/2006 |
| JP | 2006-260886 A | 9/2006 |
| JP | 2008-539328 A | 11/2008 |
| JP | 4534033 B | 9/2010 |
| KR | 2010-0097575 A | 9/2010 |
| WO | WO-2006/114034 A1 | 11/2006 |
| WO | WO-2010/041014 A2 | 4/2010 |
| WO | WO-2010/041014 A3 | 4/2010 |

* cited by examiner

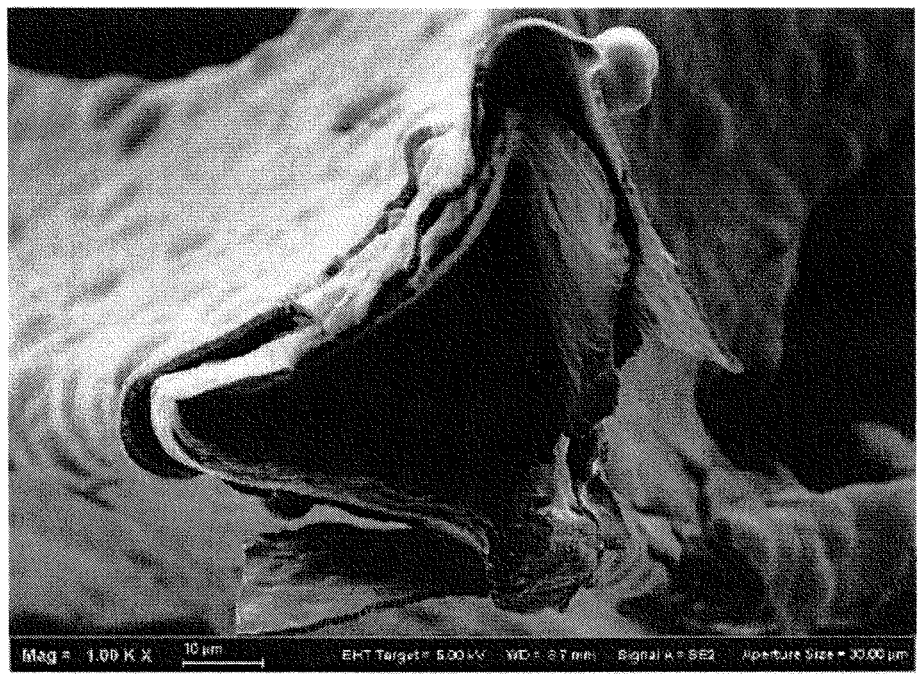

METHOD FOR PRODUCING A POROUS METAL BODY

CROSS-REFERENCE TO RELATED APPLICATIONS

This application is a divisional of U.S. patent application Ser. No. 13/992,266, filed Jun. 7, 2013, which is a § 371 of International Application No. PCT/JP2011/077650, filed Nov. 30, 2011, which claims the benefit of each of Japanese Patent Application No. 2010-273549, filed Dec. 8, 2010, Japanese Patent Application No. 2010-273550, filed Dec. 8, 2010, and Japanese Patent Application No. 2010-287439, filed Dec. 24, 2010, the entire contents each of which is incorporated herein by reference.

TECHNICAL FIELD

The present invention relates to a porous metal body used for a collector for batteries such as lithium-ion batteries, capacitors, or fuel cells.

BACKGROUND ART

In general, metal foils such as aluminum foils are used, in lithium-ion batteries, as collectors (supports) to which positive-electrode materials and negative-electrode materials are made to adhere. However, metal foils have a two-dimensional structure and hence are inferior in terms of carrying of active materials and packing density of active materials to porous bodies. Specifically, metal foils cannot hold active materials in a manner in which metal foils contain active materials. Accordingly, metal foils cannot suppress expansion or contraction of active materials and hence the amount of active materials held on metal foils is made small to ensure a life for a certain period. In addition, the distance between collectors and active materials is long and hence active materials away from collectors are less likely to be used. Thus, the capacity density becomes low. Metal foils are used in the form of a porous body such as a punched metal body, a screen, or an expanded metal body. However, these also substantially have two-dimensional structures and hence a considerable increase in the capacity density cannot be expected.

To achieve a higher output, a higher capacity, a longer life, or the like, many collectors that are, for example, three-dimensional porous bodies such as foam or nonwoven fabric have been proposed (refer to Patent Literatures 1 to 4).

For example, Patent Literature 1 discloses, as a positive-electrode collector, a three-dimensional network porous body whose surface is composed of aluminum, an alloy, or stainless steel. Patent Literature 2 discloses that an electrode mixture in which a porous polymer is uniformly distributed between active-material layers and on the surface of the active material is integrated with a collector that is a three-dimensional porous body composed of a metal such as aluminum, copper, zinc, or iron, a conductive polymer such as polypyrrole or polyaniline, or a mixture of the foregoing, to thereby form an electrode.

Patent Literature 3 discloses an electrode in which an electrode active-material thin-film layer is formed on a porous collector composed of an element of aluminum, tantalum, niobium, titanium, hafnium, zirconium, zinc, tungsten, bismuth, or antimony, an alloy of the foregoing, or a stainless-steel alloy.

Patent Literature 4 discloses that an aluminum foam, a nickel foam, or the like is used as a positive-electrode collector.

In general, to provide secondary batteries having a higher output and a higher capacity, there has been a demand for collectors that are three-dimensional structures, which are more porous than two-dimensional structures. In particular, since positive-electrode collectors are susceptible to oxidation by electrolytes under a high charging-discharging voltage, positive-electrode collectors having sufficiently high oxidation resistance and electrolytic resistance have also been demanded.

Three-dimensional metal structures having a high porosity (hereafter, referred to as "porous metal bodies") are generally produced by making a porous non-conductive resin body be electrically conductive, electroplating this porous resin body with a predetermined amount of a metal, and, if necessary, removing the remaining inner resin portion by incineration. For example, Patent Literature 5 states that a porous metal body is produced by plating the skeleton surface of a polyurethane foam with nickel and then removing the polyurethane foam. Patent Literature 6 describes a fuel-cell collector produced by forming a metal-plated layer containing fine particles composed of a fluorine-based resin having high water repellency, on the surface of a porous nickel-material base, and performing press-forming.

However, positive-electrode collectors that have oxidation resistance and electrolytic resistance, have a high porosity, and are suitable for industrial production, are not provided for lithium nonaqueous-electrolyte secondary batteries for the following reasons.

Specifically, in general, to produce a collector having a high porosity such as a porous nickel body serving as a typical example, the surface of a porous organic resin is plated and, if necessary, the organic resin is removed by incineration. However, porous nickel bodies are susceptible to oxidation in lithium nonaqueous-electrolyte secondary batteries and dissolved in electrolytic solutions. Accordingly, such batteries are not able to be sufficiently charged after charging and discharging are performed for a long period of time.

On the other hand, in order to perform plating with aluminum, which currently serves as a main material of positive-electrode collectors, molten salt at a very high temperature needs to be used. Accordingly, organic-resin bodies cannot be plated and it is difficult to plate organic-resin surfaces. Thus, porous aluminum collectors are not currently provided.

Stainless steel is also widely used as a material of positive-electrode collectors. However, for the same reason as for aluminum, it is also difficult to provide collectors having a high porosity by plating organic-resin surfaces with stainless steel.

Note that the following method is provided: a porous stainless-steel body is produced by applying stainless-steel powder to a porous organic-resin body and sintering the applied powder.

However, stainless-steel powder is very expensive. In addition, a porous organic-resin body to which the powder adheres is removed by incineration and the resultant body has a poor strength and is not usable, which is problematic.

Accordingly, there is a demand for a collector that has oxidation resistance and electrolytic resistance, has a high porosity, and is suitable for industrial production; and a positive electrode including such a collector.

CITATION LIST

Patent Literature

PTL 1: Japanese Unexamined Patent Application Publication No. 11-233151
PTL 2: Japanese Unexamined Patent Application Publication No. 2000-195522
PTL 3: Japanese Unexamined Patent Application Publication No. 2005-078991
PTL 4: Japanese Unexamined Patent Application Publication No. 2006-032144
PTL 5: Japanese Unexamined Patent Application Publication No. 11-154517
PTL 6: Japanese Patent Publication No. 4534033

SUMMARY OF INVENTION

Technical Problem

In view of the above-described problems, an object of the present invention is to provide a porous metal body that is excellent in terms of heat resistance and corrosion resistance such as electrolytic resistance and that is suitable for a collector for batteries such as lithium-ion batteries, capacitors, or fuel cells; and a method for producing the porous metal body.

Solution to Problem

An embodiment of the present invention relates to a method for producing a porous metal body containing at least nickel and tungsten, the method including a step of coating a porous nickel body with an alloy containing at least nickel and tungsten; and a step of subsequently performing a heat treatment to diffuse tungsten into the porous nickel body.

Another embodiment of the present invention relates to the method for producing a porous metal body, wherein the porous nickel body is obtained by coating, with nickel, a porous base having been made electrically conductive, removing the porous base, and subsequently reducing nickel.

Another embodiment of the present invention relates to the method for producing a porous metal body, wherein the heat-treated porous metal body has a nickel content of 60 mass % or more and 95 mass % or less and a tungsten content of 5 mass % or more and 40 mass % or less.

Another embodiment of the present invention relates to the method for producing a porous metal body, wherein the heat-treated porous metal body further contains, as a component, 10 mass % or less of phosphorus.

Another embodiment of the present invention relates to a porous metal body including an alloy containing at least nickel and tungsten.

Another embodiment of the present invention relates to the porous metal body, wherein the porous metal body has a nickel content of 60 mass % or more and 95 mass % or less and a tungsten content of 5 mass % or more and 40 mass % or less.

Another embodiment of the present invention relates to the porous metal body, wherein the porous metal body further contains, as a component, 10 mass % or less of phosphorus.

Another embodiment of the present invention relates to the porous metal body, wherein the porous metal body has been subjected to an electrolytic oxidation treatment in liquid so as to have enhanced corrosion resistance.

Another embodiment of the present invention relates to a method for producing a porous metal body containing an alloy containing at least nickel and tin, the method including a step of coating a porous nickel body with a metal containing at least tin; and a step of subsequently performing a heat treatment to diffuse tin into the porous nickel body.

Another embodiment of the present invention relates to the method for producing a porous metal body, wherein the porous nickel body is obtained by coating, with nickel, a porous base having been made electrically conductive, removing the porous base, and subsequently reducing nickel.

Another embodiment of the present invention relates to a porous metal body including an alloy containing at least nickel and tin.

Another embodiment of the present invention relates to the porous metal body, wherein the porous metal body has a tin content of 1 to 58 mass %.

Another embodiment of the present invention relates to the porous metal body, wherein the porous metal body further contains, as a component, 10 mass % or less of phosphorus.

Another embodiment of the present invention relates to the porous metal body, wherein the porous metal body has been subjected to an electrolytic oxidation treatment in liquid so as to have enhanced corrosion resistance.

Another embodiment of the present invention relates to a method for producing a porous metal body containing at least nickel and tungsten or tin, the method including: a step of plating, with nickel, a porous base having been made electrically conductive to form a nickel-plated layer, subsequently washing the nickel-plated layer, and then continuously, without letting a surface of the nickel-plated layer dry, plating the surface of the nickel-plated layer with an alloy containing at least nickel and tungsten or an alloy containing at least nickel and tin to form an alloy-plated layer; a step of removing the porous base by heating in an oxidizing atmosphere; and a step of subsequently reducing metal by performing a heat treatment in a reducing atmosphere, wherein the step of removing the porous base and the step of reducing metal are performed to diffuse tungsten or tin in the alloy-plated layer into the nickel-plated layer.

Another embodiment of the present invention relates to the method for producing a porous metal body, the method further including, after the step of reducing metal, a step of performing a heat treatment in an inert atmosphere or a reducing atmosphere to diffuse tungsten or tin.

Another embodiment of the present invention relates to the method for producing a porous metal body, wherein, after the step of reducing metal, the porous metal body has a nickel content of 60 mass % or more and 95 mass % or less and a tungsten content of 5 mass % or more and 40 mass % or less.

Another embodiment of the present invention relates to the method for producing a porous metal body, wherein, after the step of reducing metal, the porous metal body has a tin content of 1 to 58 mass %.

Another embodiment of the present invention relates to the method for producing a porous metal body, wherein, after the step of reducing metal, the porous metal body further contains, as a component, 10 mass % or less of phosphorus.

Advantageous Effects of Invention

The present invention can provide a porous metal body that is excellent in terms of electrolytic resistance and corrosion resistance and that is suitable for a collector for batteries such as lithium-ion batteries, capacitors, or fuel cells; and a method for producing the porous metal body.

According to an embodiment of the present invention, by subjecting a porous nickel body to a nickel-tungsten-alloy plating treatment or a tin plating treatment, the porous nickel body having a high strength reduces the stress of a nickel-tungsten-alloy-plated layer or a tin-plated layer and hence the nickel-tungsten-alloy-plated layer having a high stress can be formed with stability. Accordingly, separation and cracking of the alloy-plated layer can be suppressed. A porous metal body containing nickel and tungsten or a porous metal body containing nickel and tin obtained after a subsequent heat treatment can have enhanced quality.

According to another embodiment of the present invention, after nickel plating, without letting the nickel-plated layer dry, nickel-tungsten-alloy plating or nickel-tin-alloy plating is continuously performed. As a result, the adhesion between the nickel-plated layer and the nickel-tungsten- (or tin-) alloy-plated layer is enhanced. Thus, separation and cracking of the nickel-tungsten- (or tin-) alloy film due to stress can be suppressed.

BRIEF DESCRIPTION OF DRAWING

FIG. 1 is a micrograph of a portion of a section of a porous metal body produced in COMPARATIVE EXAMPLE 3-3 in relation to the fifth embodiment of the present invention, the portion being observed with a scanning electron microscope (SEM).

DESCRIPTION OF EMBODIMENTS

First Embodiment

A method for producing a porous metal body according to a first embodiment of the present invention includes a step of coating a porous nickel body with an alloy containing at least nickel and tungsten; and a step of subsequently performing a heat treatment to diffuse tungsten into the porous nickel body. By thus plating a porous nickel body, which is a strong material, a nickel-tungsten-alloy-plated layer exhibiting a high stress can be formed with stability and hence separation and cracking of the alloy-plated layer can be suppressed. In addition, by performing the heat treatment in an inert atmosphere or a reducing atmosphere, tungsten can be diffused in the porous nickel body.

The porous nickel body can be produced by subjecting the surface of a porous base to an electrically conductive treatment to form an electrically conductive film (hereafter, referred to as "conductive coating layer"); subsequently forming an electroplating layer on the surface of the porous base by subjecting the conductive coating layer to nickel electroplating; and then removing the porous base and subsequently reducing nickel.

(Porous Base)

A porous base used in the first embodiment will suffice as long as the base is porous and may be a publicly known base or a commercially available base. For example, a resin foam, nonwoven fabric, felt, woven fabric, or the like may be used and, if necessary, these may be used in combination. The material is not particularly limited; however, a material that can be plated with metal and then can be removed by incineration is preferred. In particular, when a porous base having the form of a sheet is highly stiff, it may break during handling. Accordingly, the material is preferably flexible.

In the first embodiment, a resin foam is preferably used as a porous base. Examples of a resin foam include a urethane foam, a styrene foam, and a melamine-resin foam. Of these, a urethane foam is particularly preferred in view of a high porosity.

The porosity of the porous base is not limited and is generally about 60% or more and about 97% or less, and preferably about 80% or more and about 96% or less. The thickness of the porous base is not limited and is appropriately determined in accordance with the application or the like; however, the thickness is generally about 300 μm or more and about 5000 μm or less, and preferably about 400 μm or more and about 2000 μm or less.

Hereinafter, the present invention will be described with reference to an example where a resin foam is used as a porous base.

(Electrically Conductive Treatment)

An electrically conductive treatment is not limited as long as a layer having electrical conductivity can be formed on the surface of a resin foam. Examples of a material for forming such a layer having electrical conductivity (conductive coating layer) include metals such as nickel, titanium, and stainless steel; and graphite.

Regarding specific examples of the electrically conductive treatment, for example, when a metal such as nickel is used, preferred examples include electroless plating and vapor-phase treatments such as sputtering, vapor deposition, and ion plating. Alternatively, for example, when an alloy metal such as stainless steel or graphite is used as a material, a mixture prepared by mixing fine powder of such a material with a binder is preferably applied to the surface of a resin foam.

The electroless plating with nickel can be performed by, for example, immersing a resin foam into a publicly known electroless-nickel-plating bath such as an aqueous solution of nickel sulfate containing sodium hypophosphite serving as a reducing agent. If necessary, prior to the immersion into the plating bath, a resin foam may be immersed into, for example, an activation solution containing a small amount of palladium ions (a cleaning solution manufactured by JAPAN KANIGEN CO., LTD.).

The sputtering treatment with nickel can be performed by, for example, holding a resin foam with a substrate holder, then introducing an inert gas and applying a direct voltage between the holder and a target (nickel) to thereby make inert-gas ions impinge onto the nickel and deposit the sputtered nickel particles onto the surface of the resin foam.

The coating weight (adhesion amount) of the conductive coating layer is preferably adjusted such that the final metal composition in terms of the total of this coating weight and the coating weights of a nickel-plated layer and a nickel-tungsten-alloy-plated layer that are formed in subsequent steps contains 60 mass % or more and 95 mass % or less of nickel and 5 mass % or more and 40 mass % or less of tungsten.

When the conductive coating layer is formed of nickel, it will suffice that the conductive coating layer is continuously formed on the surface of a resin foam and the coating weight of the conductive coating layer is not limited; however, the coating weight is generally about 5 $g/m^2$ or more and about 15 $g/m^2$ or less, and preferably about 7 $g/m^2$ or more and about 10 $g/m^2$ or less.

(Electrolytic Nickel Plating Treatment)

An electrolytic nickel plating treatment may be performed in a standard manner. A plating bath used for the electrolytic nickel plating treatment may be a publicly known plating bath or a commercially available plating bath. Examples of the plating bath include a Watts bath, a chloride bath, and a sulfamate bath.

A nickel coating can be further formed on the conductive coating layer, which is formed on the surface of the porous base by the electroless plating or sputtering, by immersing the porous base into a plating bath and passing direct current or pulse current between a cathode to which the porous base is connected and an anode to which a nickel counter electrode plate is connected.

The coating weight of the electrolytic nickel-plated layer needs to be adjusted such that the porous metal body finally has a metal composition containing 60 mass % or more and 95 mass % or less of nickel and 5 mass % or more and 40 mass % or less of tungsten.

(Resin-Foam Removal Treatment and Reduction Treatment)

The process of removing a resin-foam component is not limited; however, a resin-foam component is preferably removed by incineration. Specifically, for example, a resin-foam component may be heated at about 600° C. or more in an oxidizing atmosphere such as the air. The resultant porous body is heated in a reducing atmosphere so that the metal is reduced. Thus, a porous nickel body is provided.

The above-described method for producing a porous nickel body is disclosed in, for example, Japanese Unexamined Patent Application Publication Nos. 04-002795 and 08-069801.

Hereinafter, the way by which steps are performed after the porous nickel body is obtained will be described.

(Electrolytic Nickel-Tungsten Plating Treatment)

An electrolytic nickel-tungsten plating treatment may be performed in a standard manner (for example, a method disclosed in Japanese Unexamined Patent Application Publication No. 10-130878). At this time, as described in Japanese Unexamined Patent Application Publication No. 2002-241986, a plating film can be made so as to contain phosphorus depending on an agent used. In this case, the porous metal body preferably further contains, in addition to nickel and tungsten, as a component, 10 mass % or less of phosphorus.

A plating bath used for the electrolytic nickel-tungsten plating treatment may be a publicly known plating bath or a commercially available plating bath. For example, a plating solution usable has a composition containing 60 g of sodium tungstate, 20 g of nickel sulfate, 60 g of citric acid, and 40 g of ammonia with respect to 1000 g of water.

A nickel-tungsten coating can be further formed on the porous nickel body by immersing the porous nickel body into a plating bath and passing direct current or pulse current between a cathode to which the porous nickel body is connected and an anode to which a nickel counter electrode plate and a tungsten counter electrode plate are connected. In order to suppress decomposition of additives, an insoluble anode is preferably used that serves as the third anode and is disposed in an anode case including an ion exchange membrane. This insoluble anode may be, for example, a titanium body plated with platinum. The anode case is filled with about 10 mass % of sulfuric acid.

The coating weight of the electrolytic nickel-tungsten-alloy-plated layer is preferably adjusted such that the porous metal body finally has a metal composition containing 60 mass % or more and 95 mass % or less of nickel and 5 mass % or more and 40 mass % or less of tungsten.

(Circulation of Plating Solution During Plating)

In general, when a resin foam is plated, it is difficult to uniformly plate the interior of the resin foam. To suppress generation of unplated interior portions and to reduce the difference in plating amount between the interior and the exterior, a plating solution is preferably circulated. The circulation can be achieved by a method of, for example, using a pump or a fan that is placed in a plating tank. When such a method is used and a plating solution is directed to a base or a base is placed next to a suction port, the plating solution tends to flow through the interior of the base, which is effective.

(Heat Treatment)

After the electrolytic nickel-tungsten plating treatment, nickel having low corrosion resistance is exposed. Accordingly, a heat treatment needs to be performed to diffuse the tungsten component. In this heat-treatment step, the tungsten component is preferably sufficiently diffused in the nickel-plated layer such that the tungsten concentration ratio between the exterior and interior of a porous metal skeleton, that is, the exterior concentration/interior concentration is in the range of 2/1 to ½ inclusive, more preferably 3/2 to ⅔ inclusive, still more preferably 4/3 to ¾ inclusive, and, most preferably, uniform diffusion of the tungsten component.

When the heat-treatment temperature is excessively low, the diffusion takes a long time. When the heat-treatment temperature is excessively high, softening is caused and the porous structure may be damaged due to the self weight. Thus, the heat treatment is preferably performed in a range of 300° C. or more and 1500° C. or less, more preferably 500° C. or more and 1300° C. or less, still more preferably 800° C. or more and 1100° C. or less. The atmosphere is preferably a non-oxidizing atmosphere of nitrogen, argon, or the like; or a reducing atmosphere of hydrogen or the like.

(Metal Coating Weight)

The total metal coating weight of the conductive coating layer, the nickel coating layer (electrolytic nickel-plated layer), and the alloy film layer (nickel-tungsten-alloy-plated layer) is preferably 200 $g/m^2$ or more and 1000 $g/m^2$ or less, more preferably 300 $g/m^2$ or more and 600 $g/m^2$ or less, still more preferably 400 $g/m^2$ or more and 500 $g/m^2$ or less. When the total weight is less than 200 $g/m^2$, the collector may have a low strength. When the total weight is more than 1000 $g/m^2$, the packing amount of a polarizable material becomes small and disadvantage in terms of cost is also caused.

(Pore Size)

When the porous metal body is used as a catalytic layer of a fuel cell, the porous metal body preferably has an average pore size of 1 μm or more and 50 μm or less, more preferably 2 μm or more and 20 μm or less, and still more preferably 2 μm or more and 5 μm or less. Alternatively, when the porous metal body is used as a collector, the porous metal body preferably has an average pore size of 50 μm or more and 1000 μm or less, more preferably 50 μm or more and 600 μm or less, and still more preferably 80 μm or more and 300 μm or less.

(Confirmation of Composition of Porous Metal Body)

A quantitative measurement employing inductively coupled plasma (ICP) may be performed to determine mass % of contained elements.

(Confirmation of Diffusion of Tungsten)

A section of the porous metal body may be subjected to an energy dispersive X-ray spectroscopy (EDX) measurement. The spectra are compared between the skeleton exterior and the skeleton interior so that the diffusion state of tungsten can be confirmed.

Second Embodiment

A porous metal body according to a second embodiment of the present invention contains an alloy containing at least nickel and tungsten. Since the porous metal body contains an alloy containing at least nickel and tungsten, it is excellent in terms of electrolytic resistance and corrosion resistance.

When the porous metal body has a nickel content of 60 mass % or more and 95 mass % or less and a tungsten content of 5 mass % or more and 40 mass % or less, it has sufficiently high electrolytic resistance and corrosion resistance.

The porous metal body according to the second embodiment preferably further contains, as a component, 10 mass % or less of phosphorus. In this case, electrolytic resistance and corrosion resistance are further enhanced. However, when the phosphorus content is excessively high, heat resistance is degraded; accordingly, the phosphorus content is preferably 10 mass % or less.

In addition, the porous metal body according to the second embodiment is preferably a porous metal body having been subjected to an electrolytic oxidation treatment in liquid so as to have enhanced corrosion resistance. In this case, a porous metal body having further enhanced electrolytic resistance and corrosion resistance can be obtained.

For example, the treatment can be performed with linear sweep voltammetry: specifically, electric potentials in a wide range are applied once to a sample to determine an electric potential at which the current value is high; and the electric potential at which the current is high is subsequently applied until the current becomes sufficiently low.

Third Embodiment

A method for producing a porous metal body according to a third embodiment of the present invention includes a step of coating a porous nickel body with a metal containing at least tin; and a step of subsequently performing a heat treatment to diffuse tin into the porous nickel body. A heat treatment may be performed in an inert atmosphere or a reducing atmosphere to diffuse tin into the porous nickel body.

The porous nickel body is preferably produced by subjecting the surface of a porous base to an electrically conductive treatment to form an electrically conductive film (hereafter, referred to as "conductive coating layer"); subsequently forming an electroplating layer on the surface of the porous base by subjecting the conductive coating layer to nickel electroplating; and then removing the porous base and subsequently reducing nickel.

(Porous Base)

A porous base used in the present invention will suffice as long as the base is porous and may be a publicly known base or a commercially available base. For example, a resin foam, nonwoven fabric, felt, woven fabric, or the like may be used and, if necessary, these may be used in combination. The material is not particularly limited; however, a material that can be plated with metal and then can be removed by incineration is preferred. In particular, when a porous base having the form of a sheet is highly stiff, it may break during handling. Accordingly, the material is preferably flexible.

In the present invention, a resin foam is preferably used as a porous base. Examples of a resin foam include a urethane foam, a styrene foam, and a melamine-resin foam. Of these, a urethane foam is particularly preferred in view of a high porosity.

The porosity of the porous base is not limited and is generally about 60% or more and about 97% or less, and preferably about 80% or more and about 96% or less. The thickness of the porous base is not limited and is appropriately determined in accordance with the application or the like; however, the thickness is generally about 300 μm or more and about 5000 μm or less, and preferably about 400 μm or more and about 2000 μm or less.

Hereinafter, the present invention will be described with reference to an example where a resin foam is used as a porous base.

(Electrically Conductive Treatment)

An electrically conductive treatment is not limited as long as a layer having electrical conductivity can be formed on the surface of a resin foam. Examples of a material for forming such a layer having electrical conductivity (conductive coating layer) include metals such as nickel, titanium, and stainless steel; and graphite.

Regarding specific examples of the electrically conductive treatment, for example, when a metal such as nickel is used, preferred examples include electroless plating and vapor-phase treatments such as sputtering, vapor deposition, and ion plating. Alternatively, for example, when an alloy metal such as stainless steel or graphite is used as a material, a mixture prepared by mixing fine powder of such a material with a binder is preferably applied to the surface of a resin foam.

The electroless plating with nickel can be performed by, for example, immersing a resin foam into a publicly known electroless-nickel-plating bath such as an aqueous solution of nickel sulfate containing sodium hypophosphite serving as a reducing agent. If necessary, prior to the immersion into the plating bath, a resin foam may be immersed into, for example, an activation solution containing a small amount of palladium ions (a cleaning solution manufactured by JAPAN KANIGEN CO., LTD.).

The sputtering treatment with nickel can be performed by, for example, holding a resin foam with a substrate holder, then introducing an inert gas and applying a direct voltage between the holder and a target (nickel) to thereby make inert-gas ions impinge onto the nickel and deposit the sputtered nickel particles onto the surface of the resin foam.

The coating weight (adhesion amount) of the conductive coating layer is preferably adjusted such that the final metal composition in terms of the total of this coating weight and the coating weights of a nickel-plated layer and a nickel-tin-alloy-plated layer that are formed in subsequent steps contains 42 mass % or more and 99 mass % or less of nickel and 1 mass % or more and 58 mass % or less of tin.

When the conductive coating layer is formed of nickel, it will suffice that the conductive coating layer is continuously formed on the surface of a resin foam and the coating weight of the conductive coating layer is not limited; however, the coating weight is generally about 5 g/m$^2$ or more and about 15 g/m$^2$ or less, and preferably about 7 g/m$^2$ or more and about 10 g/m$^2$ or less.

(Electrolytic Nickel Plating Treatment)

An electrolytic nickel plating treatment may be performed in a standard manner. A plating bath used for the electrolytic nickel plating treatment may be a publicly known plating bath or a commercially available plating bath. Examples of the plating bath include a Watts bath, a chloride bath, and a sulfamate bath.

A nickel coating can be further formed on the conductive coating layer, which is formed on the surface of the porous base by the electroless plating or sputtering, by immersing the porous base into a plating bath and passing direct current or pulse current between a cathode to which the porous base is connected and an anode to which a nickel counter electrode plate is connected.

The coating weight of the electrolytic nickel-plated layer is preferably adjusted such that the porous metal body finally has a metal composition containing 42 mass % or more and 99 mass % or less of nickel and 1 mass % or more and 58 mass % or less of tin.

(Resin-Foam Removal Treatment and Reduction Treatment)

The process of removing a resin-foam component is not limited; however, a resin-foam component is preferably removed by incineration. Specifically, for example, a resin-foam component may be heated at about 600° C. or more in an oxidizing atmosphere such as the air.

The resultant porous body is heated in a reducing atmosphere so that the metal is reduced. Thus, a porous nickel body is provided.

The above-described method for producing a porous nickel body is disclosed in, for example, Japanese Unexamined Patent Application Publication Nos. 04-002795 and 08-069801.

Hereinafter, the way by which steps are performed after the porous nickel body is obtained will be described.

(Tin Plating Step)

The step of coating a porous nickel body with a metal containing at least tin may be performed, for example, in the following manner. Specifically, a sulfuric acid bath is prepared: a plating bath having a composition containing 55 g/L of stannous sulfate, 100 g/L of sulfuric acid, 100 g/L of cresol sulfonic acid, 2 g/L of gelatin, and 1 g/L of β-naphthol. Tin plating can be performed at a cathode current density of 2 A/dm$^2$, an anode current density of 1 A/dm$^2$ or less, and a temperature of 20° C., and under 2 m/min agitation (cathode agitation).

The coating weight of the tin-plated layer is preferably adjusted such that the porous metal body finally has a metal composition containing 42 mass % or more and 99 mass % or less of nickel and 1 mass % or more and 58 mass % or less of tin.

In order to enhance adhesion of the tin-plated layer, the following processes are desirably performed: immediately before the formation of the tin-plated layer, strike nickel plating is performed; the porous metal body is washed and this porous metal body that is wet without being dried is immersed into the tin plating solution. In this case, the adhesion of the plated layer can be enhanced.

For example, the strike nickel plating can be performed under the following conditions. Specifically, a Wood's strike nickel bath having a composition containing 240 g/L of nickel chloride and 125 ml/L of hydrochloric acid (having a specific gravity of about 1.18) is prepared and adjusted to have room temperature; and the anode is composed of nickel or carbon.

The plating processes described above are summarized: degreasing with Ace Clean (cathode electrolytic degreasing: 5 ASD×1 min); washing with hot water; washing with water; acid activation (immersion in hydrochloric acid for 1 min); Wood's strike nickel plating (5 to 10 ASD×1 min); washing and, without drying, tin plating; washing with water; and drying.

(Circulation of Plating Solution During Plating)

In general, when a porous base such as a resin foam is plated, it is difficult to uniformly plate the interior of the porous base. To suppress generation of unplated interior portions and to reduce the difference in plating amount between the interior and the exterior, a plating solution is preferably circulated. The circulation can be achieved by a method of, for example, using a pump or a fan that is placed in a plating tank. When such a method is used and a plating solution is directed to a base or a base is placed next to a suction port, the plating solution tends to flow through the interior of the base, which is effective.

(Heat Treatment)

After the tin plating step, nickel having low corrosion resistance may be exposed. Accordingly, a heat treatment needs to be performed to diffuse the tin component. Tin can be diffused in an inert atmosphere (for example, nitrogen or argon, at a reduced pressure) or a reducing atmosphere (hydrogen).

In this heat-treatment step, the tin component is preferably sufficiently diffused in the nickel-plated layer such that the tin concentration ratio between the exterior and interior of a porous metal skeleton, that is, the exterior concentration/interior concentration is in the range of 2/1 to ½ inclusive, more preferably 3/2 to ⅔ inclusive, still more preferably 4/3 to ¾ inclusive, and, most preferably, uniform diffusion of the tin component.

When the heat-treatment temperature is excessively low, the diffusion takes a long time. When the heat-treatment temperature is excessively high, softening is caused and the porous structure may be damaged due to the self weight. Thus, the heat treatment is preferably performed in a range of 300° C. or more and 1100° C. or less. Note that, when the tin concentration is 40 mass % or more, the upper limit of the heat-treatment temperature needs to be 850° C. The heat-treatment temperature is more preferably 400° C. or more and 800° C. or less, still more preferably 500° C. or more and 700° C. or less.

(Nickel-Tin-Alloy Plating)

In the above description, a method in which a porous base is plated with nickel and subsequently plated with tin and alloying by a heat treatment is performed is described. Alternatively, the porous base may be subjected to an electrically conductive treatment and subsequently plated with a nickel-tin alloy. In this case, the composition of the nickel-tin-alloy plating solution is preferably adjusted such that the porous metal body finally has a metal composition containing 42 mass % or more and 99 mass % or less of nickel and 1 mass % or more and 58 mass % or less of tin. After the formation of nickel-tin-alloy plating, the porous base is removed and a heat treatment is subsequently performed in a reducing atmosphere to reduce the metal. Thus, a porous metal body is obtained. In the porous metal body, tin is diffused into the nickel-plated layer.

(Metal Coating Weight)

The total metal coating weight of the conductive coating layer, the nickel coating layer (electrolytic nickel-plated layer), and the metal film layer (tin-plated layer) is preferably 200 g/m$^2$ or more and 1000 g/m$^2$ or less, more preferably 300 g/m$^2$ or more and 600 g/m$^2$ or less, still more preferably 400 g/m$^2$ or more and 500 g/m$^2$ or less. When the total weight is less than 200 g/m$^2$, the collector may have a low strength. When the total weight is more than 1000 g/m$^2$, the packing amount of a polarizable material becomes small and disadvantage in terms of cost is also caused.

(Pore Size)

When the porous metal body is used as a catalytic layer of a fuel cell, the porous metal body preferably has an average pore size of 1 μm or more and 50 μm or less, more preferably 2 μm or more and 20 μm or less, and still more preferably 2 μm or more and 5 μm or less. Alternatively, when the porous metal body is used as a collector, the porous metal body preferably has an average pore size of 50 μm or more and 1000 μm or less, more preferably 50 μm or more and 600 μm or less, and still more preferably 80 μm or more and 300 μm or less.

(Confirmation of Composition of Porous Metal Body)

A quantitative measurement employing inductively coupled plasma (ICP) may be performed to determine mass % of contained elements.

(Confirmation of Diffusion of Tin)

A section of the porous metal body may be subjected to an energy dispersive X-ray spectroscopy (EDX) measurement. The spectra are compared between the skeleton exterior and the skeleton interior so that the diffusion state of tin can be confirmed.

Fourth Embodiment

A porous metal body according to a fourth embodiment of the present invention contains an alloy containing at least nickel and tin. Since the porous metal body contains an alloy containing at least nickel and tin, it is excellent in terms of electrolytic resistance and corrosion resistance.

The porous metal body preferably has a tin content of 1 mass % or more and 58 mass % or less. When the tin content is 1 mass % or more, sufficiently high electrolytic resistance and corrosion resistance can be exhibited. On the other hand, when the tin content is more than 58 mass %, heat resistance may be degraded and a brittle intermetallic compound may be generated, which is not preferable.

The porous metal body according to the fourth embodiment preferably further contains, as a component, 10 mass % or less of phosphorus. In this case, electrolytic resistance and corrosion resistance are further enhanced. However, when the phosphorus content is excessively high, heat resistance is degraded; accordingly, the phosphorus content is preferably 10 mass % or less.

In addition, the porous metal body according to the fourth embodiment is preferably a porous metal body having been subjected to an electrolytic oxidation treatment in liquid so as to have enhanced corrosion resistance. In this case, a porous metal body having further enhanced electrolytic resistance and corrosion resistance can be obtained.

For example, the treatment can be performed with linear sweep voltammetry: specifically, electric potentials in a wide range are applied once to a sample to determine an electric potential at which the current value is high; and the electric potential at which the current is high is subsequently applied until the current becomes sufficiently low.

Fifth Embodiment

A method for producing a porous metal body according to a fifth embodiment of the present invention includes a step of plating, with nickel, a porous base having been made electrically conductive to form a nickel-plated layer, subsequently washing the nickel-plated layer, and then continuously, without letting a surface of the nickel-plated layer dry, plating the surface of the nickel-plated layer with an alloy containing at least nickel and tungsten to form an alloy-plated layer; a step of removing the porous base by heating in an oxidizing atmosphere; and a step of subsequently reducing metal by performing a heat treatment in a reducing atmosphere, wherein the step of removing the porous base and the step of reducing metal are performed to diffuse tungsten in the alloy-plated layer into the nickel-plated layer.

Hereinafter, the method for producing a porous metal body according to the fifth embodiment will be described in detail.

The surface of a porous base is subjected to an electrically conductive treatment to form an electrically conductive film (hereafter, referred to as "conductive coating layer"). This conductive coating layer is then subjected to nickel electroplating to form a nickel-plated layer on the surface of the porous resin base. Subsequently, while the surface of the nickel-plated layer does not dry, the surface of the nickel-plated layer is plated with an alloy containing nickel and tungsten to form an alloy-plated layer. The porous base is then removed to provide a porous body including the nickel-plated layer and the nickel-tungsten-alloy-plated layer. This porous body is subsequently subjected to a heat treatment to diffuse tungsten in the alloy-plated layer into the nickel-plated layer. Thus, a porous metal body containing nickel and tungsten is obtained.

As described above, without letting the surface of the nickel-plated layer (formed by plating the porous base with nickel) dry, the alloy plating is continuously performed. Thus, this plating can be performed on a material having a sufficiently high strength and on an activated surface provided by plating. Accordingly, the adhesion between the nickel-plated layer and the nickel-tungsten-alloy-plated layer is enhanced and a nickel-tungsten-alloy-plated layer having a high stress can be formed with stability. As a result, separation and cracking of the alloy-plated layer can be suppressed.

After the heat-treatment step, the porous metal body preferably has a nickel content of 60 mass % or more and 95 mass % or less and a tungsten content of 5 mass % or more and 40 mass % or less. When the porous metal body thus has a nickel content of 60 mass % or more and 95 mass % or less and a tungsten content of 5 mass % or more and 40 mass % or less, the porous metal body can have enhanced electrolytic resistance and heat resistance.

(Porous Base)

A porous base used in the present invention will suffice as long as the base is porous and may be a publicly known base or a commercially available base. For example, a resin foam, nonwoven fabric, felt, woven fabric, or the like may be used and, if necessary, these may be used in combination. The material is not particularly limited; however, a material that can be plated with metal and then can be removed by incineration is preferred. In particular, when a porous base having the form of a sheet is highly stiff, it may break during handling. Accordingly, the material is preferably flexible.

In the present invention, a resin foam is preferably used as a porous base. Examples of a resin foam include a urethane foam, a styrene foam, and a melamine resin. Of these, a urethane foam is particularly preferred in view of a high porosity.

The porosity of the porous base is not limited and is generally about 60% or more and about 97% or less, and preferably about 80% or more and about 96% or less. The thickness of the porous base is not limited and is appropriately determined in accordance with the application or the like; however, the thickness is generally about 300 μm or more and about 5000 μm or less, and preferably about 400 μM or more and about 2000 μm or less.

Hereinafter, the present invention will be described with reference to an example where a resin foam is used as a porous base.

(Electrically Conductive Treatment)

An electrically conductive treatment is not limited as long as a layer having electrical conductivity can be formed on the surface of a resin foam. Examples of a material for forming such a layer having electrical conductivity (conductive coating layer) include metals such as nickel, titanium, and stainless steel; and graphite.

Regarding specific examples of the electrically conductive treatment, for example, when a metal such as nickel is used, preferred examples include electroless plating and vapor-phase treatments such as sputtering, vapor deposition, and ion plating. Alternatively, for example, when an alloy metal such as stainless steel or graphite is used as a material, a mixture prepared by mixing fine powder of such a material with a binder is preferably applied to the surface of a resin foam.

The electroless plating with nickel can be performed by, for example, immersing a resin foam into a publicly known electroless-nickel-plating bath such as an aqueous solution of nickel sulfate containing sodium hypophosphite serving as a reducing agent. If necessary, prior to the immersion into the plating bath, a resin foam may be immersed into, for example, an activation solution containing a small amount of palladium ions (a cleaning solution manufactured by JAPAN KANIGEN CO., LTD.).

The sputtering treatment with nickel can be performed by, for example, holding a resin foam with a substrate holder, then introducing an inert gas and applying a direct voltage between the holder and a target (nickel) to thereby make inert-gas ions impinge onto the nickel and deposit the sputtered nickel particles onto the surface of the resin foam.

The coating weight (adhesion amount) of the conductive coating layer is preferably adjusted such that the final metal composition in terms of the total of this coating weight and the coating weights of a nickel-plated layer and a nickel-tungsten-alloy-plated layer that are formed in subsequent steps contains 60 mass % or more and 95 mass % or less of nickel and 5 mass % or more and 40 mass % or less of tungsten.

When the conductive coating layer is formed of nickel, it will suffice that the conductive coating layer is continuously formed on the surface of a resin foam and the coating weight of the conductive coating layer is not limited; however, the coating weight is generally about 5 g/m$^2$ or more and about 15 g/m$^2$ or less, and preferably about 7 g/m$^2$ or more and about 10 g/m$^2$ or less.

(Electrolytic Nickel Plating Treatment)

An electrolytic nickel plating treatment may be performed in a standard manner. A plating bath used for the electrolytic nickel plating treatment may be a publicly known plating bath or a commercially available plating bath. Examples of the plating bath include a Watts bath, a chloride bath, and a sulfamate bath. A nickel coating can be further formed on the conductive coating layer, which is formed on the surface of the porous base by the electroless plating or sputtering, by immersing the porous base into a plating bath and passing direct current or pulse current between a cathode to which the porous base is connected and an anode to which a nickel counter electrode plate is connected.

The coating weight of the electrolytic nickel-plated layer needs to be adjusted such that the porous metal body finally has a metal composition containing 60 mass % or more and 95 mass % or less of nickel and 5 mass % or more and 40 mass % or less of tungsten.

The nickel-plated porous body provided by this step needs to be brought into the subsequent step of a nickel-tungsten plating treatment, before the nickel-plated porous body has dried. At this time, when the nickel-plated porous body has dried, the surface of the nickel-plated layer is oxidized and becomes no longer activated, resulting in a decrease in plating adhesion in the subsequent step.

(Electrolytic Nickel-Tungsten Plating Treatment)

An electrolytic nickel-tungsten plating treatment may be performed in a standard manner (for example, a method disclosed in Japanese Unexamined Patent Application Publication No. 10-130878). At this time, as described in Japanese Unexamined Patent Application Publication No. 2002-241986, a plating film can be made so as to contain phosphorus depending on an agent used. In this case, the alloy used for coating the porous nickel body preferably contains phosphorus in such an amount that the porous metal body finally obtained further contains, in addition to nickel and tungsten, as a component, 10 mass % or less of phosphorus.

A plating bath used for the electrolytic nickel-tungsten plating treatment may be a publicly known plating bath or a commercially available plating bath. For example, a plating solution usable has a composition containing 60 g of sodium tungstate, 20 g of nickel sulfate, 60 g of citric acid, and 40 g of ammonia with respect to 1000 g of water.

The nickel-plated porous body is washed with water to remove the nickel plating solution. Continuously subsequently, before the nickel-plated porous body has dried, the nickel-plated porous body is immersed in a plating bath. By passing direct current or pulse current between a cathode to which the nickel-plated porous body is connected and an anode to which a nickel counter electrode plate and a tungsten counter electrode plate are connected, a nickel-tungsten coating can be further formed on the nickel-plated porous body. At this time, in order to suppress decomposition of additives, an insoluble anode is preferably used that serves as the third anode and is disposed in an anode case including an ion exchange membrane. This insoluble anode may be, for example, a titanium body plated with platinum. The anode case is filled with about 10 mass % of sulfuric acid.

The coating weight of the electrolytic nickel-tungsten-alloy-plated layer is preferably adjusted such that the porous metal body finally has a metal composition containing 60 mass % or more and 95 mass % or less of nickel and 5 mass % or more and 40 mass % or less of tungsten.

(Circulation of Plating Solution During Plating)

In general, when a resin foam is plated, it is difficult to uniformly plate the interior of the resin foam. To suppress generation of unplated interior portions and to reduce the difference in plating amount between the interior and the exterior, a plating solution is preferably circulated. The circulation can be achieved by a method of, for example, using a pump or a fan that is placed in a plating tank. When such a method is used and a plating solution is directed to a base or a base is placed next to a suction port, the plating solution tends to flow through the interior of the base, which is effective.

(Heat Treatment: Porous-Base Removal Treatment and Reduction Treatment)

Regarding the process of removing a porous base such as a resin foam, for example, the porous base may be heated at about 600° C. or more in an oxidizing atmosphere such as the air. Thus, the porous base can be removed by incineration. The resultant porous body is heated in a reducing atmosphere so that the metal is reduced. Thus, a porous metal body is provided. The reduction is preferably performed in a hydrogen atmosphere in a temperature range of 600° C. or more and 1500° C. or less, more preferably in a range of 800° C. or more and 1500° C. or less, still more preferably in a range of 1000° C. or more and 1500° C. or less.

The heat treatments in the step of removing a porous base (a resin foam or the like) and in the subsequent step of reducing the porous metal body allow diffusion of the tungsten component in the nickel-tungsten-alloy-plated layer into the nickel-plated layer. In general, a nickel-plated layer have low corrosion resistance. However, in the fifth embodiment, as described above, the base removal step is performed at 600° C. or more and the reduction treatment is performed under the above-described conditions. As a result, the tungsten component can be sufficiently diffused in the nickel-plated layer to provide a porous metal body having high corrosion resistance. At this time, the tungsten concentration ratio between the exterior and interior of a porous metal skeleton, that is, the exterior concentration/interior concentration is preferably 2/1 to ½ inclusive, more preferably 3/2 to ⅔ inclusive, still more preferably 4/3 to ¾ inclusive, and, most preferably, uniform diffusion of the tungsten component.

If necessary, in addition to the above-described steps, by performing a heat-treatment step in an inert atmosphere or a reducing atmosphere, the tungsten concentration can be made more uniform. When this heat-treatment temperature is excessively low, the diffusion takes a long time. When the heat-treatment temperature is excessively high, softening is caused and the porous structure may be damaged due to the self weight. Thus, the heat treatment is preferably performed in a range of 300° C. or more and 1500° C. or less, more preferably in a range of 500° C. or more and 1300° C. or less, still more preferably in a range of 800° C. or more and 1100° C. or less. The atmosphere is preferably a non-oxidizing atmosphere of nitrogen, argon, or the like; or a reducing atmosphere of hydrogen or the like.

(Metal Coating Weight)

The total metal coating weight of the conductive coating layer, the nickel coating layer (electrolytic nickel-plated layer), and the alloy film layer (nickel-tungsten-alloy-plated layer) is preferably 200 g/m$^2$ or more and 1000 g/m$^2$ or less, more preferably 300 g/m$^2$ or more and 600 g/m$^2$ or less, still more preferably 400 g/m$^2$ or more and 500 g/m$^2$ or less. When the total weight is less than 200 g/m$^2$, the collector may have a low strength. When the total weight is more than 1000 g/m$^2$, the packing amount of a polarizable material becomes small and disadvantage in terms of cost is also caused.

(Pore Size)

When the porous metal body is used as a catalytic layer of a fuel cell, the porous metal body preferably has an average pore size of 1 μm or more and 50 μm or less, more preferably 2 μm or more and 20 μm or less, and still more preferably 2 μm or more and 5 μm or less. Alternatively, when the porous metal body is used as a collector, the porous metal body preferably has an average pore size of 50 μm or more and 1000 μm or less, more preferably 50 μm or more and 600 μm or less, and still more preferably 80 μm or more and 300 μm or less.

(Confirmation of Composition of Porous Metal Body)

A quantitative measurement employing inductively coupled plasma (ICP) may be performed to determine mass % of contained elements.

(Confirmation of Diffusion of Tungsten)

A section of the porous metal body may be subjected to an energy dispersive X-ray spectroscopy (EDX) measurement. The spectra are compared between the skeleton exterior and the skeleton interior so that the diffusion of tungsten can be confirmed.

EXAMPLES

EXAMPLES relating to the first embodiment and the second embodiment will be described.

Example 1-1

A polyurethane sheet having a thickness of 1.5 mm was used as a porous resin sheet (porous base). The surfaces of this sheet were treated by immersing the sheet in a mixed solution of 400 g/L of chromium trioxide and 400 g/L of sulfuric acid at 60° C. for a minute. As a result of such a surface treatment, the sheet is made to have an anchoring effect on a conductive film to be formed thereon, resulting in a high adhesion.

A carbon coating material was then prepared by dispersing 20 g of a carbon powder having a particle size of 0.01 to 20 μm in 80 g of a 10% aqueous solution of an acrylic styrene synthetic resin.

The urethane foam having been surface-treated was subsequently made electrically conductive by being continuously immersed in the coating material, squeezed with rollers, and then dried.

The porous resin sheet having been made electrically conductive was then subjected to nickel plating. Thus, a porous nickel body having a coating weight of 200 g/m$^2$ was provided.

The nickel plating was performed with a sulfamate bath. The sulfamate bath was prepared as an aqueous solution containing 450 g/L of nickel sulfamate and 30 g/L of boric acid and having a pH of 4, and was adjusted to have a temperature of 55° C. The nickel plating was performed at a current density of 20 ASD (A/dm$^2$).

Heating was further performed in the air at 1000° C. for 15 minutes to remove the porous resin sheet through incineration. At this time, the porous body was partially oxidized. Accordingly, a reduction treatment was then further performed in a reducing (hydrogen) atmosphere under conditions of 1000° C. and 20 minutes.

The porous nickel body prepared above and having a coating weight of 200 g/m$^2$ was subjected to nickel-tungsten-alloy electroplating (electrolytic nickel-tungsten plating treatment) with a coating weight of 200 g/m$^2$, and to a heat treatment to diffuse tungsten. Thus, a porous metal body having a composition of 87 mass % nickel and 13 mass % tungsten was obtained.

A plating solution used for the nickel-tungsten-alloy electroplating contained, with respect to 1000 g of water, 60 g of sodium tungstate, 20 g of nickel sulfate, 60 g of citric acid, and 40 g of ammonia. In the plating bath, the bath temperature was 65° C. and the current density was 10 A/dm$^2$. The plating solution was agitated with a pump.

In the heat-treatment step, a heat treatment was performed in a reducing (hydrogen) atmosphere at 1000° C. for 50 minutes.

Comparison between EDX spectra revealed no difference between the exterior and interior and tungsten was believed to be diffused uniformly.

Example 1-2

A porous nickel body having a coating weight of 150 g/m$^2$ was subjected to nickel-tungsten-alloy electroplating with a coating weight of 450 g/m$^2$, and to a heat treatment to diffuse tungsten. Thus, a porous metal body having a composition of 70 mass % nickel and 30 mass % tungsten was obtained. Note that the same procedures were performed as in EXAMPLE 1-1 except that the nickel coating weight and the nickel-tungsten-alloy coating weight were changed.

Comparison between EDX spectra revealed no difference between the exterior and interior and tungsten was believed to be diffused uniformly.

Example 1-3

A porous nickel body having a coating weight of 200 g/m$^2$ was subjected to nickel-tungsten-phosphorus-alloy electroplating with a coating weight of 200 g/m², and to a heat treatment to diffuse tungsten. Thus, a porous metal body having a composition of 85 mass % nickel, 12 mass % tungsten, and 3 mass % phosphorus was obtained.

A plating solution used for the nickel-tungsten-phosphorus-alloy electroplating contained, with respect to 1000 g of water, 60 g of sodium tungstate, 40 g of nickel sulfate, 20 g of phosphorous acid, 60 g of citric acid, and 20 g of ammonia. The plating solution was adjusted to have a pH of 5 and a temperature of 65° C. and the nickel-tungsten-phosphorus-alloy electroplating was performed at a current density of 10 A/dm².

The other conditions were the same as in EXAMPLE 1-1.

Comparison between EDX spectra revealed no difference between the exterior and interior and tungsten was believed to be diffused uniformly.

Comparative Example 1-1

A urethane foam having been made electrically conductive was plated with nickel and subjected to a heat treatment to remove urethane. Thus, a porous nickel body having a coating weight of 300 g/m² was obtained. The conditions for the electrically conductive treatment, nickel plating, and heat treatment were the same as in EXAMPLE 1-1.

Comparative Example 1-2

A porous nickel-tungsten body was produced in the same manner as in EXAMPLE 1-1 except that the final heat treatment was not performed.

The EDX spectrum showed that no tungsten peak was present in the skeleton interior. Thus, pure nickel was believed to be exposed in the interior.

<Evaluation>

(Evaluation of Electrolytic Resistance)

In order to examine the electrolytic resistance, polarization measurement was performed by a method in compliance with American Society for Testing and Materials (ASTM) G5. Each of the porous metal bodies was cut to provide a sample having dimensions of 1 cm width×2 cm. A platinum wire was welded to the sample to provide a working electrode. A reference electrode was a silver/silver chloride electrode. A counter electrode was a platinum mesh. A sodium sulfate solution having a concentration of 1 mol/L was used. This solution was adjusted to have a pH of 5 and a temperature of 60° C. for the measurement. Hydrogen bubbling was performed to purge dissolved oxygen with hydrogen and the measurement was then performed under the bubbling. The sample was placed in the solution such that the apparent immersion area thereof was 1 cm². Potential was swept in the range of −0.3 to 1 V with reference to the standard hydrogen potential at a rate of 5 mV/s. The maximum values of flowing currents are described below.

TABLE I

|  | Maximum current value (A) |
| --- | --- |
| Example 1-1 | 0.0011 |
| Example 1-2 | 0.0008 |
| Example 1-3 | 0.0009 |
| Comparative example 1-1 | 0.1452 |
| Comparative example 1-2 | 0.1371 |

A current of 0.1 A flowed in the porous nickel body in COMPARATIVE EXAMPLE 1-1. In contrast, only a current of 0.001 A, which is two orders of magnitude smaller, flowed in the porous nickel-tungsten bodies in the present invention; thus, excellent electrolytic resistance was exhibited. In COMPARATIVE EXAMPLE 1-2, a current similar to that in COMPARATIVE EXAMPLE 1-1 also flowed. Accordingly, it has been demonstrated that diffusion of tungsten by a heat treatment is necessary.

(Evaluation of Heat Resistance)

Regarding heat resistance, porous metal bodies were heated in the air at 600° C. for 10 hours and changes in the porous metal bodies were observed. The changes due to the heating are summarized in the following table.

TABLE II

|  | Example 1-1 | Example 1-2 | Example 1-3 | Comparative example 1-1 | Comparative example 1-2 |
| --- | --- | --- | --- | --- | --- |
| Changes due to heating | No change | No change | No change | Discoloration Decrease in strength Oxidized | No change in skeleton exterior Decrease in strength |

Porous metal bodies containing nickel and tungsten according to the present invention have higher heat resistance than the porous bodies of COMPARATIVE EXAMPLES. Although no change was observed in the appearance of the porous body in COMPARATIVE EXAMPLE 1-2, the strength clearly decreased. This is believed to be because the interior nickel layer was oxidized.

Hereinafter, EXAMPLES relating to the third and fourth embodiments will be described.

Example 2-1

A polyurethane sheet having a thickness of 1.5 mm was used as a porous resin sheet (porous base). The surfaces of this sheet were treated by immersing the sheet in a mixed solution of 400 g/L of chromium trioxide and 400 g/L of sulfuric acid at 60° C. for a minute. As a result of such a surface treatment, the sheet is made to have an anchoring effect on a conductive film to be formed thereon, resulting in a high adhesion.

A carbon coating material was then prepared by dispersing 20 g of a carbon powder having a particle size of 0.01 to 20 µm in 80 g of a 10% aqueous solution of an acrylic styrene synthetic resin.

The urethane foam having been surface-treated was subsequently made electrically conductive by being continuously immersed in the coating material, squeezed with rollers, and then dried.

The porous resin sheet having been made electrically conductive was then subjected to nickel plating. Thus, a porous nickel body having a coating weight of 200 g/m² was provided.

The nickel plating was performed with a sulfamate bath. The sulfamate bath was prepared as an aqueous solution containing 450 g/L of nickel sulfamate and 30 g/L of boric acid and having a pH of 4, and was adjusted to have a temperature of 55° C. The nickel plating was performed at a current density of 20 ASD (A/dm²).

Heating was further performed in the air at 1000° C. for 15 minutes to remove the porous resin sheet through incineration. At this time, the porous metal body was partially oxidized. Accordingly, a reduction treatment was then further performed in a reducing (hydrogen) atmosphere under conditions of 1000° C. and 20 minutes.

The porous nickel body prepared above and having a coating weight of 200 g/m² was subjected to tin plating with a coating weight of 2 g/m², and to a heat treatment to diffuse tin. Thus, a porous metal body having a composition of 99 mass % nickel and 1 mass % tin was obtained.

A plating solution used for the tin plating contained, with respect to 1000 g of water, 55 g/L of stannous sulfate, 100 g/L of sulfuric acid, 100 g/L of cresol sulfonic acid, 2 g/L of gelatin, and 1 g/L of β-naphthol. The plating bath temperature was 20° C. and the anode current density was 1 A/dm². The plating solution was agitated by cathode agitation at 2 m/min.

In the heat-treatment step, a heat treatment was performed in a reducing (hydrogen) atmosphere at 550° C. for 10 minutes.

Comparison between EDX spectra revealed no difference between the exterior and interior and tin was believed to be diffused uniformly.

Example 2-2

A porous metal body was produced as in EXAMPLE 2-1 except that the coating weight of the tin-plated layer for the porous nickel body was 59.7 g/m². Thus, a porous nickel-tin-alloy body having a Sn content of 23 mass % was obtained.

Comparison between EDX spectra revealed no difference between the exterior and interior and tin was believed to be diffused uniformly.

Example 2-3

A porous metal body was produced as in EXAMPLE 2-1 except that the coating weight of the tin-plated layer for the porous nickel body was 216.7 g/m². Thus, a porous nickel-tin-alloy body having a Sn content of 52 mass % was obtained.

Comparison between EDX spectra revealed no difference between the exterior and interior and tin was believed to be diffused uniformly.

Example 2-4

A porous nickel-tin-alloy body having a Sn content of 23 mass % was produced as in EXAMPLE 2-2 so that the coating weight of the tin-plated layer was 59.7 g/m². In addition, a potential of 0.2 V vs standard hydrogen electrode (SHE) was applied for 15 minutes in a sodium sulfate aqueous solution having a concentration of 1 mol/L.

Comparison between EDX spectra revealed no difference between the exterior and interior and tin was believed to be diffused uniformly.

Comparative Example 2-1

As in EXAMPLE 2-1, a urethane foam having been made electrically conductive was subjected to nickel plating and a heat treatment to remove urethane. Thus, a porous nickel body was prepared.

Comparative Example 2-2

As in EXAMPLE 2-1, a urethane foam having been made electrically conductive was subjected to nickel electroplating, a heat treatment to remove urethane, and then to tin plating. Unlike EXAMPLE 2-1, the heat-treatment step after the tin plating was not performed.

<Evaluation>

(Evaluation of Electrolytic Resistance)

In order to examine the electrolytic resistance, polarization measurement was performed by a method in compliance with ASTM G5. Each of the porous metal bodies was cut to provide a sample having dimensions of 1 cm width×2 cm. A reference electrode was a silver/silver chloride electrode. A counter electrode was a platinum mesh. A sodium sulfate solution having a concentration of 1 mol/L was used. This solution was adjusted to have a pH of 5 and a temperature of 60° C. for the measurement. Hydrogen bubbling was performed to purge dissolved oxygen with hydrogen and the measurement was then performed under the bubbling. The sample was placed in the solution such that the apparent immersion area thereof was 1 cm². Potential was swept in the range of −0.3 to 1 V with reference to the standard hydrogen potential at a rate of 5 mV/s. The maximum values of flowing currents are described in Table III below.

TABLE III

| | Maximum current value (A) |
|---|---|
| Example 2-1 | 0.0021 |
| Example 2-2 | 0.0010 |
| Example 2-3 | 0.0018 |
| Example 2-4 | 0.0006 |
| Comparative example 2-1 | 0.1422 |
| Comparative example 2-2 | 0.1379 |

A current of 0.1 A or more flowed in the porous nickel body in COMPARATIVE EXAMPLE 2-1. In contrast, only a current of 0.002 A or less flowed in the porous nickel-tin bodies in the present invention; thus, excellent electrolytic resistance was exhibited. The result of EXAMPLE 2-4 indicates that the treatment of applying a constant potential can cause a decrease in the current. This is believed to be because application of a constant potential resulted in the formation of a dense oxide film in the surface.

On the other hand, in COMPARATIVE EXAMPLE 2-2, a current similar to that in COMPARATIVE EXAMPLE 2-1 also flowed. Accordingly, it has been demonstrated that diffusion of tin by a heat treatment is necessary.

Hereinafter, EXAMPLES relating to the fifth embodiment will be described.

Example 3-1

A polyurethane sheet having a thickness of 1.5 mm was used as a porous resin sheet (porous base). The surfaces of this sheet were treated by immersing the sheet in a mixed solution of 400 g/L of chromium trioxide and 400 g/L of sulfuric acid, at 60° C. for a minute. As a result of such a surface treatment, the sheet is made to have an anchoring effect on a conductive film to be formed thereon, resulting in a high adhesion.

A carbon coating material was then prepared by dispersing 20 g of a carbon powder having a particle size of 0.01 to 20 μm in 80 g of a 10% aqueous solution of an acrylic styrene synthetic resin.

The urethane foam having been surface-treated as described above was subsequently made electrically conductive by being continuously immersed in the coating material, squeezed with rollers, and then dried.

The porous resin sheet having been made electrically conductive was then subjected to nickel plating. Thus, a porous nickel body having a coating weight of 200 g/m² was provided.

The nickel plating was performed with a sulfamate bath. The sulfamate bath was prepared as an aqueous solution containing 450 g/L of nickel sulfamate and 30 g/L of boric acid and having a pH of 4, and was adjusted to have a temperature of 55° C. The nickel plating was performed at a current density of 20 ASD (A/dm²).

After the nickel plating with a coating weight of 200 g/m², the porous nickel body was washed with water and then continuously, without letting the surface of the porous nickel body dry, subjected to nickel-tungsten-alloy electroplating (electrolytic nickel-tungsten plating treatment) with a coating weight of 200 g/m². In addition, a heat treatment was performed to diffuse tungsten. Thus, a porous metal body having a composition of 87 mass % nickel and 13 mass % tungsten was obtained.

A plating solution used for the nickel-tungsten-alloy electroplating contained, with respect to 1000 g of water, 60 g of sodium tungstate, 20 g of nickel sulfate, 60 g of citric acid, and 40 g of ammonia. In the plating bath, the bath temperature was 65° C. and the current density was 10 A/dm². The plating solution was agitated with a pump.

In the step of removing the porous resin body, heating was performed in the air at 1000° C. for 20 minutes to remove the base (porous resin sheet) through incineration. At this time, the porous metal body was partially oxidized. Accordingly, another heat treatment (reduction treatment) was subsequently performed in a reducing (hydrogen) atmosphere under conditions of 1000° C. and 50 minutes.

Comparison between EDX spectra revealed no difference between the exterior and interior and tungsten was believed to be diffused uniformly. A section of the porous body was observed with an electron microscope and a phenomenon of separation between the nickel-plated layer and the nickel-tungsten-alloy-plated layer was not observed.

Example 3-2

After nickel plating with a coating weight of 150 g/m², the porous nickel body was washed with water, then continuously, without letting the surface of the porous nickel body dry, subjected to nickel-tungsten-alloy plating with a coating weight of 450 g/m², and subjected to a heat treatment to diffuse tungsten. Thus, a porous metal body having a composition of 70 mass % nickel and 30 mass % tungsten was obtained. The same procedures were performed as in EXAMPLE 3-1 except that the nickel coating weight and the nickel-tungsten-alloy coating weight were changed.

Comparison between EDX spectra revealed no difference between the exterior and interior and tungsten was believed to be diffused uniformly. A section of the porous body was observed with an electron microscope and a phenomenon of separation between the nickel-plated layer and the nickel-tungsten-alloy-plated layer was not observed.

Example 3-3

After nickel plating with a coating weight of 200 g/m², the porous nickel body was washed with water, then continuously, without letting the surface of the porous nickel body dry, subjected to nickel-tungsten-phosphorus-alloy electroplating with a coating weight of 200 g/m², and subjected to a heat treatment to diffuse tungsten. Thus, a porous metal body having a composition of 85 mass % nickel, 12 mass % tungsten, and 3 mass % phosphorus was obtained.

A plating solution used for the nickel-tungsten-phosphorus-alloy electroplating contained, with respect to 1000 g of water, 60 g of sodium tungstate, 40 g of nickel sulfate, 20 g of phosphorous acid, 60 g of citric acid, and 20 g of ammonia. The plating solution was adjusted to have a pH of 5 and a temperature of 65° C. and the nickel-tungsten-phosphorus-alloy electroplating was performed at a current density of 10 A/dm².

The other conditions were the same as in EXAMPLE 3-1.

Comparison between EDX spectra revealed no difference between the exterior and interior and tungsten was believed to be diffused uniformly. A section of the porous body was observed with an electron microscope and a phenomenon of separation between the nickel-plated layer and the nickel-tungsten-alloy-plated layer was not observed.

Comparative Example 3-1

A urethane foam having been made electrically conductive was plated with nickel and subjected to a heat treatment to remove urethane. Thus, a porous nickel body having a coating weight of 300 g/m² was obtained. The conditions for the electrically conductive treatment and nickel plating were the same as in EXAMPLE 3-1.

Comparative Example 3-2

A porous nickel-tungsten body was produced in the same manner as in EXAMPLE 3-1 except that the final heat treatment was not performed.

The EDX spectrum indicated that no tungsten peak was present in the skeleton interior. Thus, pure nickel was believed to be exposed in the interior.

Comparative Example 3-3

A porous nickel-tungsten body was obtained as in EXAMPLE 3-1 except that the porous nickel body produced in EXAMPLE 3-1 was washed with water and, after the surface of the porous nickel body dried, the porous nickel body was subjected to nickel-tungsten-alloy plating. A section of the porous body was observed with an electron microscope. As shown in FIG. 1, a phenomenon of separation between the nickel-plated layer and the nickel-tungsten-alloy-plated layer was observed. Note that the scale bar in the lower left of FIG. 1 represents 10 μm. In FIG. 1, the interior in the section of the porous metal body is the nickel-plated layer and the exterior is the nickel-tungsten-alloy-plated layer.

<Evaluation>

(Evaluation of Electrolytic Resistance)

In order to examine the electrolytic resistance, polarization measurement was performed by a method in compliance with ASTM G5. Each of the porous metal bodies was cut to provide a sample having dimensions of 1 cm width×2 cm. A platinum wire was welded to the sample to provide a working electrode. A reference electrode was a silver/silver chloride electrode. A counter electrode was a platinum mesh. A sodium sulfate solution having a concentration of 1 mol/L was used. This solution was adjusted to have a pH of 5 and a temperature of 60° C. for the measurement. Hydrogen bubbling was performed to purge dissolved oxygen with hydrogen and the measurement was then performed under the bubbling. The sample was placed in the solution such that the apparent immersion area thereof was 1 cm². Potential was swept in the range of −0.3 to 1 V with reference to the standard hydrogen potential at a rate of 5 mV/s. The maximum values of flowing currents are described below.

TABLE IV

|  | Maximum current value (A) |
| --- | --- |
| Example 3-1 | 0.0010 |
| Example 3-2 | 0.0008 |
| Example 3-3 | 0.0008 |
| Comparative example 3-1 | 0.1510 |
| Comparative example 3-2 | 0.1429 |
| Comparative example 3-3 | 0.0011 |

A current of 0.1 A flowed in the porous nickel body in COMPARATIVE EXAMPLE 3-1. In contrast, only a current of 0.001 A, which is two orders of magnitude smaller, flowed in the porous nickel-tungsten bodies in the present invention; thus, excellent electrolytic resistance was exhibited. In COMPARATIVE EXAMPLE 3-2, a current similar to that in COMPARATIVE EXAMPLE 3-1 also flowed. Accordingly, it has been demonstrated that diffusion of tungsten by a heat treatment is necessary.

(Evaluation of Heat Resistance)

Regarding heat resistance, porous metal bodies were heated in the air at 600° C. for 10 hours and changes in the porous metal bodies were observed. The changes due to the heating are summarized in the following table.

TABLE V

|  | Example 3-1 | Example 3-2 | Example 3-3 | Comparative example 3-1 | Comparative example 3-2 | Comparative example 3-3 |
| --- | --- | --- | --- | --- | --- | --- |
| Changes due to heating | No change | No change | No change | Discoloration Decrease in strength Oxidized | No change in skeleton exterior Decrease in strength | No change |

Porous nickel-tungsten bodies according to the present invention have higher heat resistance than the porous bodies of COMPARATIVE EXAMPLES 3-1 and 3-2. Although no change was observed in the appearance of the porous body in COMPARATIVE EXAMPLE 3-2, the strength clearly decreased. This is believed to be because the interior nickel layer was oxidized. As described above, in the porous body of COMPARATIVE EXAMPLE 3-3, separation between the nickel-plated layer and the nickel-tungsten-alloy-plated layer was observed. This is believed to be because the nickel-tungsten-alloy-plated layer had a high stress and the alloy-plated layer warped; and an oxide film was formed on the nickel base and hence adhesion between the nickel base and the nickel-tungsten-alloy-plated layer was poor.

According to the present invention, since plating is continuously performed before drying occurs, formation of an oxide film can be suppressed and sufficient adhesion can be achieved even in spite of high stress.

INDUSTRIAL APPLICABILITY

A porous metal body according to the present invention is excellent in terms of electrolytic resistance and corrosion resistance and hence can be suitably used as a collector for batteries such as lithium-ion batteries, capacitors, or fuel cells.

The invention claimed is:

1. A method for producing a porous metal body containing an alloy containing at least nickel and tin, the method comprising a step of coating a porous nickel body with a metal containing at least tin; and a step of subsequently performing a heat treatment to diffuse tin into the porous nickel body;
   the porous metal body has a metal composition containing 1 mass % or more and 58 mass % or less of tin,
   the tin concentration ratio between the exterior and interior of a porous metal skeleton, that is, the exterior concentration/interior concentration is in the range of 2/1 to ½,
   wherein the porous metal body has an average pore size of 50 μm or more and 1000 μm or less, and
   wherein a total metal coating weight of the porous metal body is 200 g/m² or more and 1000 g/m² or less.

2. The method for producing a porous metal body according to claim 1, wherein the porous nickel body is obtained by coating, with nickel, a porous base having been made electrically conductive, removing the porous base, and subsequently reducing nickel.

3. The method for producing a porous metal body according to claim 1, wherein the exterior concentration/interior concentration is in the range of 3/2 to ⅔.

4. The method for producing a porous metal body according to claim 1, wherein the exterior concentration/interior concentration is in the range of 4/3 to ¾.

5. The method for producing a porous metal body according to claim 1, wherein a porosity of the porous metal body is 60% or more and 97% or less.

* * * * *